United States Patent
Mori et al.

(10) Patent No.: US 8,274,867 B2
(45) Date of Patent: Sep. 25, 2012

(54) METHOD FOR ALIGNING THE LIGHT SOURCE UNIT AND THE SLIDER OF THERMALLY-ASSISTED MAGNETIC RECORDING HEAD

(75) Inventors: Nobuyuki Mori, Tokyo (JP); Seiichi Takayama, Tokyo (JP); Yoshihiro Tsuchiya, Tokyo (JP); Yasuhiro Ito, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 360 days.

(21) Appl. No.: 12/751,104

(22) Filed: Mar. 31, 2010

(65) Prior Publication Data

US 2011/0242697 A1 Oct. 6, 2011

(51) Int. Cl.
*G11B 11/00* (2006.01)
(52) U.S. Cl. .................... 369/13.33; 369/13.13
(58) Field of Classification Search ............ 369/13.33, 369/13.13, 13.32, 13.12, 112.09, 112.14, 369/112.21, 112.27, 300; 360/59; 385/129, 385/31, 88–94; 29/603.01–603.27; 250/201.3, 250/201.5
See application file for complete search history.

(56) References Cited

U.S. PATENT DOCUMENTS

| | | | |
|---|---|---|---|
| 4,860,276 A | 8/1989 | Ukita et al. | |
| 5,481,082 A | 1/1996 | Yamamoto | |
| 6,499,888 B1 | 12/2002 | Wu | |
| 7,538,978 B2 | 5/2009 | Sato et al. | |
| 7,804,655 B2 | 9/2010 | Shimazawa et al. | |
| 2005/0213436 A1 | 9/2005 | Ono et al. | |
| 2008/0043360 A1 | 2/2008 | Shimazawa et al. | |
| 2008/0056073 A1 | 3/2008 | Shimizu | |
| 2009/0052078 A1 | 2/2009 | Tanaka et al. | |
| 2009/0059411 A1 | 3/2009 | Tanaka et al. | |
| 2011/0128827 A1* | 6/2011 | Shimazawa et al. | 369/13.33 |
| 2011/0157738 A1* | 6/2011 | Shimazawa et al. | 369/13.33 |
| 2011/0228649 A1* | 9/2011 | Shimazawa et al. | 369/13.33 |
| 2011/0228653 A1* | 9/2011 | Shimazawa et al. | 369/13.32 |
| 2011/0242697 A1 | 10/2011 | Mori et al. | |

FOREIGN PATENT DOCUMENTS

JP A 61-174791 8/1986

(Continued)

OTHER PUBLICATIONS

U.S. Appl. No. 12/628,761 in the name of Shimazawa et al. filed Dec. 1, 2009.

(Continued)

*Primary Examiner* — Tan X Dinh
(74) *Attorney, Agent, or Firm* — Oliff & Berridge, PLC

(57) ABSTRACT

Provided is a method for manufacturing a thermally-assisted magnetic recording head with "composite slider structure". In the method, the waveguide is irradiated with a first light from opposed-to-medium surface side, and the passing first light is detected on back surface side to obtain an image of the light-receiving end surface, and a light-receiving center position is determined from the image. Further, the light source is irradiated with a second light from opposite side to joining surface, and the passing second light is detected on the joining surface side to obtain an image of the light-emitting end surface, and a light-emitting center position is determined from the image. Then, the slider and the light source unit are moved based on the determined positions of the light-receiving and light-emitting centers, aligned and bonded. As a result, alignment can be performed with high accuracy in a short process time under simplified process.

7 Claims, 10 Drawing Sheets

FOREIGN PATENT DOCUMENTS

| | | |
|---|---|---|
| JP | A 8-181388 | 7/1996 |
| JP | A 11-185232 | 7/1999 |
| JP | A 2003-142892 | 5/2003 |
| JP | A 2009-301597 | 12/2009 |

OTHER PUBLICATIONS

U.S. Appl. No. 12/726,981 in the name of Shimazawa et al. filed Mar. 18, 2010.

U.S. Appl. No. 12/728,510 in the name of Shimazawa et al. filed Mar. 22, 2010.

U.S. Appl. No. 12/648,079 in the name of Shimazawa et al. filed Dec. 28, 2009.

Oct. 17, 2011 Office Action issued in U.S. Appl. No. 12/728,510.

Jan. 24, 2012 Notice of Allowance issued in U.S. Appl. No. 12/728,510.

Rottmayer et al., "Heat-Assisted Magnetic Recording," IEEE Transactions on Magnetics, vol. 42, No. 10, Oct. 2006 pp. 2417-2421.

U.S. Appl. No. 12/648,079, filed Dec. 28, 2009 in the name of Shimazawa et al.

* cited by examiner

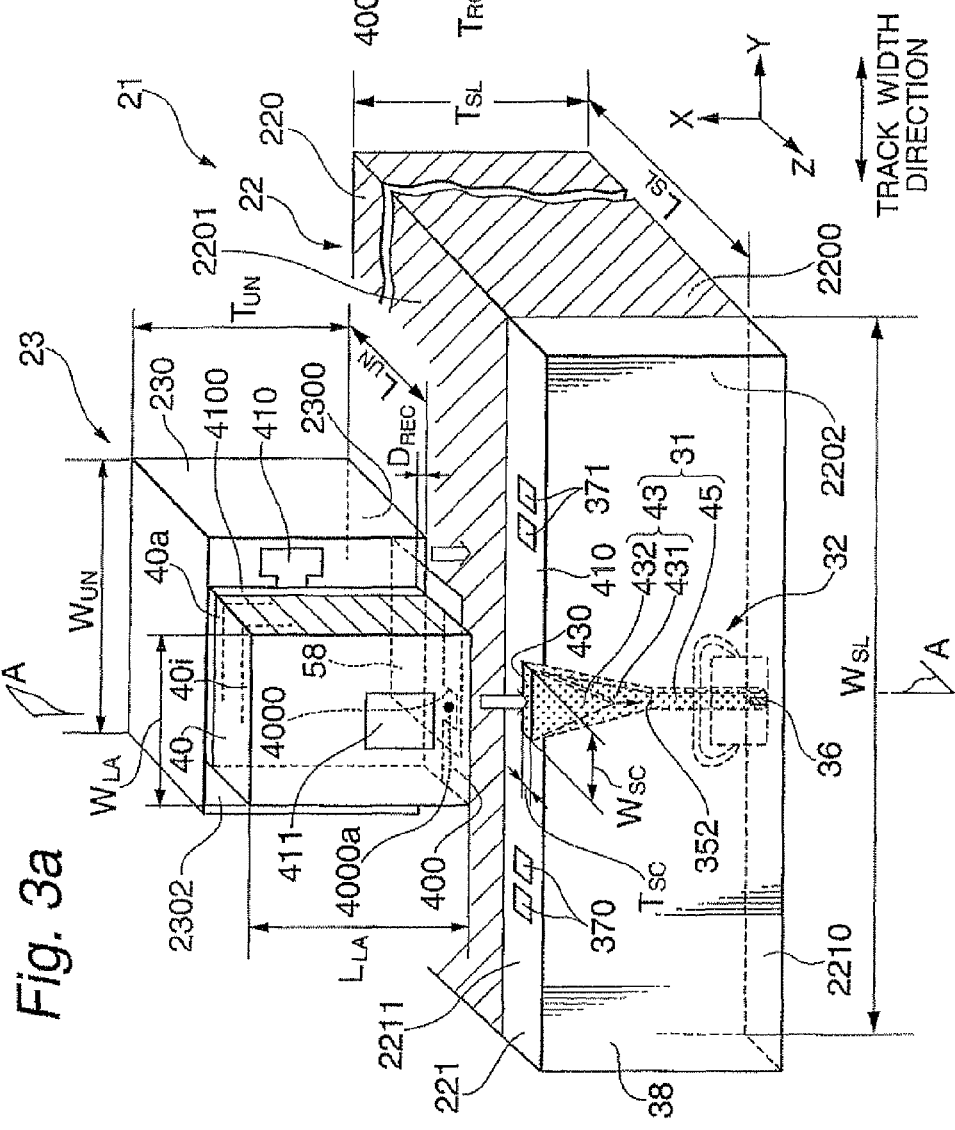
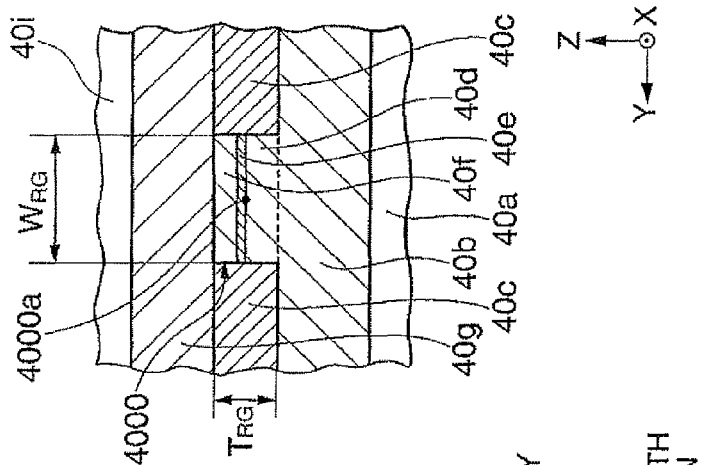

METHOD FOR ALIGNING THE LIGHT SOURCE UNIT AND THE SLIDER OF THERMALLY-ASSISTED MAGNETIC RECORDING HEAD

BACKGROUND OF THE INVENTION

1. Field of the Invention

The present invention relates to a thermally-assisted magnetic recording head fabricated by joining a slider and a light source unit that includes a light source, and further relates to a method for manufacturing the thermally-assisted magnetic recording head.

2. Description of the Related Art

As the recording densities of magnetic recording apparatuses become higher, as represented by magnetic disk apparatuses, further improvement has been required in the performance of thin-film magnetic heads and magnetic recording media. As the thin-film magnetic heads, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic grains gathered together, and each of the magnetic grains has a single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light (NF-light). In this case, it is significantly important to stably supply a light with a sufficiently high intensity at a desired position on the magnetic recording medium. However, from the beginning, more significant problem to be solved exists in where and how a light source with a sufficiently high output of light should be disposed inside a head.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

As described above, various types of the setting of the light source are suggested. However, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1.

In fabrication of a thermally-assisted magnetic recording head having such a "composite slider structure", it is significantly important to accurately align the light source unit with the slider when joining them together.

In practice, the head need to be fabricated in such a way that light emitted from the light-emitting center located in the light-emitting surface of the light source is reliably allowed to be incident exactly at the light-receiving end of an optical system such as a waveguide located on the back surface of the slider, in order to provide a sufficiently high light use efficiency. To this end, the light-emitting center and the light-receiving end are aligned with each other in the track width direction and in the direction perpendicular to the track width direction as accurately as possible. Typically, it is preferable that the accuracy of the alignment be within ±1 μm (micrometer) in actual manufacturing.

One approach to achieving such high alignment accuracy is active alignment. In the active alignment, a light source such as a laser diode is actually being activated while the light source and the optical system are moved relative to each other, light emitted from the light source and incident at the light-receiving end of the optical system is monitored on the light-emitting end side of the optical system in real time, and a monitoring position at which the highest light intensity is obtained is set as the desired relative position of the light source and the optical system. However, the active alignment is a method of merely locating a two-dimensional optimum position and has the drawback of requiring a considerably long time for alignment. In addition, power supply probes need to be applied to the electrodes of the light source in order to keep activating the light source during the alignment, which further increase the time required for the alignment. Furthermore, a head structure and probing facilities which are required for the probing increase the manufacturing load.

There is another approach called passive alignment. In the passive alignment, a light source and an optical system are physically coupled to each other or are moved through image recognition, thus to align them with each other using an existing groove, an existing projection, or a marker provided in the light source and/or the optical system as a mark for alignment. In general, the passive alignment takes a shorter time than the active alignment. As an example of passive alignment, Japanese Patent Publication No. 2003-142892A discloses a method in which a recognition marker of the first joint object on the upper surface side and a recognition marker of the second joint object are aligned by using the positional relation of the recognition marker of the first joint object on the upper surface side with a recognition marker on the lower surface side or a contour of the first joint object. In the alignment of this method, a dual-field-of-view recognition means is required to be inserted between the first joint object and the second joint object.

Since the passive alignment uses such a recognition means which is, for example, inserted or drawn out, and since the added markers may have a positional error, the accuracy of the passive alignment tends to be low compared with the active alignment. In addition, it is considerably difficult to find or add a marker for the passive alignment on the light-source unit during fabrication of a head having the "composite slider structure". Further, it is also difficult to perform an alignment with use of a contour of the joint object. In fact, since processing accuracy, that is dimensional accuracy of the contour, is, for example, approximately ±5 µm, it is difficult to secure alignment accuracy within ±1 µm by using the positions of the contour as a standard.

As understood from the above descriptions, there is a need for a novel alignment method capable of aligning a light source unit and a slider with each other with a sufficiently high alignment accuracy in a short processing time due to simplified processes, in fabrication of a thermally-assisted magnetic recording head having a "composite slider structure".

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a method for manufacturing a thermally-assisted magnetic recording head is provided, in which a slider and a light source unit are joined to each other, the slider including a waveguide provided in an element-integration surface adjacent to an opposed-to-medium surface of a slider substrate, the waveguide having a light-receiving end surface extending to a back surface of the slider on the side opposite to the opposed-to-medium surface, and the light source unit including a light source provided in a source-installation surface adjacent to a joining surface of a unit substrate, the light source having a light-emitting end surface on the joining surface side.

The manufacturing method comprises steps of:
irradiating the waveguide with a first light from the opposed-to-medium surface side of the slider, and detecting the first light that has passed through the slider on the back surface side of the slider to obtain an image of the light-receiving end surface;

determining a position of a light-receiving center in the light-receiving end surface from the image of the light-receiving end surface;

irradiating the light source with a second light from the side opposite to the joining surface of the light source unit, and detecting the second light that has passed through the light source unit on the joining surface side of the light source unit to obtain an image of the light-emitting end surface;

determining a position of a light-emitting center in the light-emitting end surface from the image of the light-emitting end surface;

moving the slider and the light source unit with respect to each other on the basis of the determined position of the light-receiving center and the determined position of the light-emitting center to align the slider and the light source unit with each other; and bonding the slider and the light source unit together in such a manner that the back surface and the joining surface are joined to each other.

In the method for manufacturing a thermally-assisted magnetic recording head having "composite slider structure" according to the present invention, alignment is performed on the basis of images of the light-receiving end surface and the light-emitting end surface, the images formed through image recognition by irradiating the slider and the light source unit with the first and second lights, respectively. Therefore, the slider and the light source unit can be aligned with each other with a sufficiently high alignment accuracy in a short process time under a simplified process. Specifically, the method according to the present invention can achieve a high alignment accuracy compared with conventional passive alignment because the light-receiving center of the waveguide and the light-emitting center of the light source can be directly recognized through image recognition without having to rely on markers, and no operations such as inserting and withdrawing recognition means between the slider and the light source unit to be joined are required.

Further, in the method for manufacturing the thermally-assisted magnetic recording head according to the present invention, it is preferable that the slider and the light source unit are set in such a manner that the light-emitting end surface of the light source can move parallel to a reference plane including the back surface of the slider to a position in which the light-emitting end surface faces the light-receiving end surface of the waveguide, the waveguide and the light source are irradiated with the first light and the second light, respectively, and then the slider and the light source unit are moved with respect to each other in such a way that the light-emitting end surface moves parallel to the reference plane to align the slider and the light source unit with each other. In this preferable case, it is further preferable that the slider and the light source unit are moved with respect to each other in such a way that the light-emitting center in the light-emitting end surface and the light-receiving center in the light-receiving end surface are in a straight line perpendicular to the reference plane, to align the slider and the light source unit with each other.

Further, in the method for manufacturing the thermally-assisted magnetic recording head according to the present invention, it is preferable the waveguide is formed of a dielectric material, and the first light is an infrared light that has a wavelength that passes through the dielectric material. And it is also preferable that the light source is formed of a semiconductor material, and the second light is an infrared light that has a wavelength that passes through the semiconductor material. Furthermore, it is preferable that an image of the light-receiving end surface and an image of the light-emitting end surface are formed through image recognition performed by using the detected first light and the detected second light, respectively, and then the position of the light-receiving center and the position of the light-emitting center are determined by using the formed images.

Further, in the method for manufacturing the thermally-assisted magnetic recording head according to the present invention, it is preferable that a first light source provided on the opposed-to-medium surface side of the slider is used to irradiate the waveguide with the first light, and the first light that has passed through the slider is detected by using a first photodetector provided on the back surface side of the slider, and that a second light source provided on the side opposite to the joining surface of the light source unit is used to irradiate the light source with the second light, and the second light that has passed through the light source unit is detected by using a second photodetector provided on the joining surface side of the light source unit. By using the alignment system including the first and second light sources and the first and second photodetectors, the above-described method for manufacturing the thermally-assisted magnetic recording head can be reliably performed with a high efficiency.

According to the present invention, a thermally-assisted magnetic recording head is further provided, which comprises:

a slider comprising a waveguide provided in an element-integration surface adjacent to an opposed-to-medium surface of a slider substrate, the waveguide having a light-receiving end surface extending to a back surface of the slider on the side opposite to the opposed-to-medium surface, the waveguide being formed of a material that transmits a first light; and a light source unit comprising a light source provided in a source-installation surface adjacent to a joining surface of a unit substrate, the light source having a light-emitting end surface positioned on the joining surface side, the light source being made of a material that transmits a second light;

the slider and the light source unit being aligned with each other in such a manner that a position of a light-receiving center in the light-receiving end surface is determined by irradiating the waveguide with the first light and detecting the first light that has passed through the slider, a position of a light-emitting center in the light-emitting end surface is determined by irradiating the light source with the second light and detecting the second light that has passed through the light source unit, and the determined positions are used as a basis for the alignment of the slider and the light source unit; and the slider and the light source unit being bonded to each other in such a manner that the back surface and the joining surface are joined to each other.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 3a shows a perspective view illustrating one embodiment of the thermally-assisted magnetic recording head according to the present invention;

FIG. 3b shows a cross-sectional view illustrating a ridge structure of a laser diode;

DESCRIPTION OF THE PREFERRED EMBODIMENTS

Figure 1:
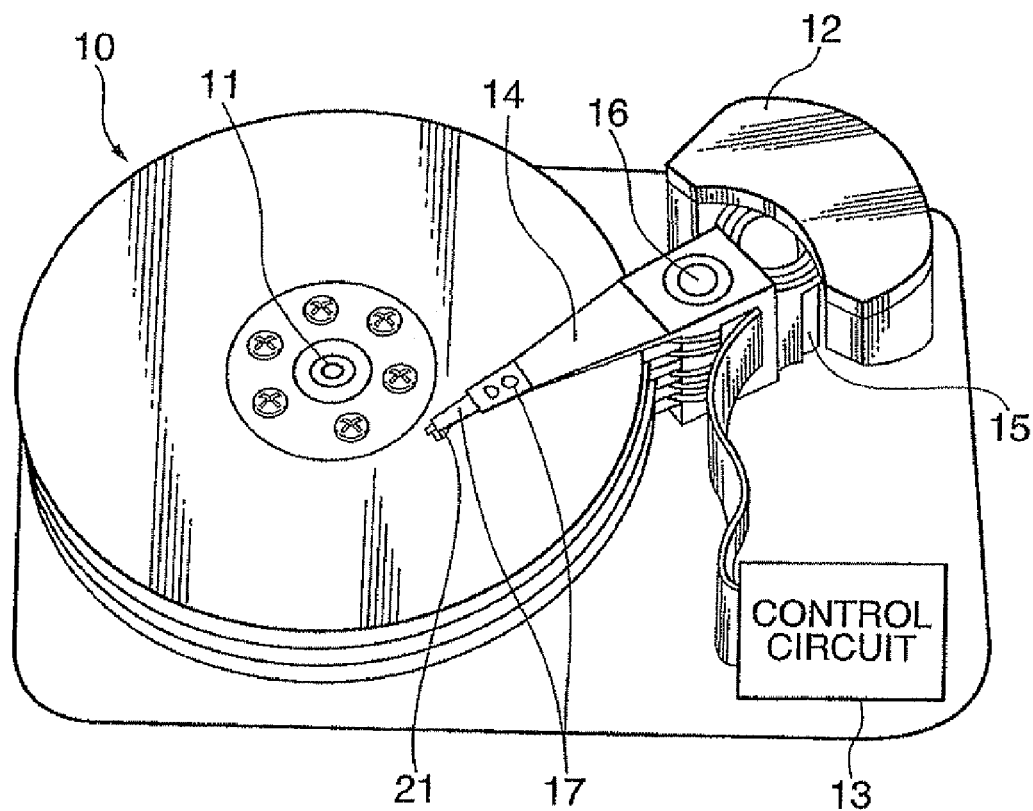
FIG. 1 shows a perspective view schematically illustrating a structure of a major part in one embodiment of a magnetic recording apparatus according to the present invention.
Figure 2:
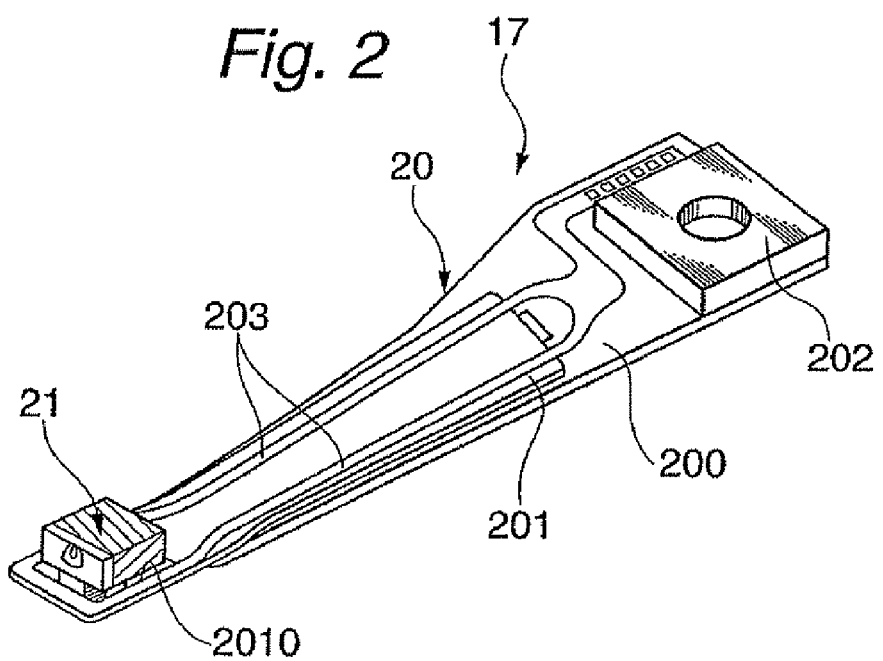
FIG. 2 shows a perspective view schematically illustrating a structure of a major part in one embodiment of a head gimbal assembly (HGA) according to the present invention.

FIG. 1 shows a perspective view schematically illustrating a structure of a major part in one embodiment of a magnetic recording apparatus according to the present invention. FIG. 2 shows a perspective view schematically illustrating a structure of a major part in one embodiment of a head gimbal assembly (HGA) according to the present invention. In FIG. 2, the side of the HGA opposed to the surface of the magnetic disk is presented as the upper side.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Referring to FIG. 2, a suspension 20 in the HGA 17 includes a load beam 200, a flexure 201 with elasticity fixed to the load beam 200, a base plate 202 provided on the base portion of the load beam 200, and a wiring member 203 provided on the flexure 201 and made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height). Here, an aperture 2010 is provided in the flexure 201; the thermally-assisted magnetic recording head 21 is fixed in such a way that a part of the head 21 (a light source unit 23 in FIG. 3) protrudes from the opposite side of the flexure 201 through the aperture 2010. Moreover, one ends (connection pads) of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

FIG. 3a shows a perspective view illustrating one embodiment of the thermally-assisted magnetic recording head 21 according to the present invention. And FIG. 3b shows a cross-sectional view illustrating a ridge structure of a laser diode 40.

As shown in FIG. 3a, a thermally-assisted magnetic recording head 21 is constituted by aligning and joining a light source unit 23 that includes a laser diode 40 and a slider 22 that includes an waveguide 31. The slider 22 includes: a slider substrate 220 having an air bearing surface (ABS) 2200 processed so as to provide an appropriate flying height; and a head element part 221 formed on an element-integration surface 2202 that is perpendicular to and adjacent to the ABS 2200. While, the light source unit 23 includes: a unit substrate 230 having an joining surface 2300; and a laser diode 40 as a light source provided on a source-installation surface 2302 that is perpendicular to and adjacent to the joining surface 2300. The slider 22 and the light source unit 23 are bonded to each other in such a way that the back surface 2201 of the slider substrate 220 and the joining surface 2300 of the unit substrate 230 are opposed to each other and sandwich a solder layer 58 as an adhesion material layer therebetween.

Here, the unit substrate 230 can be made of a material such as AlTiC ($Al_2O_3$—TiC), Si, GaAs or SiC. In particular, by making the unit substrate 230 of such as Si, GaAs or SiC, the light source unit 23 and the slider 22 can be reliably bonded with use of a laser light, which will be described in detail later. While, the slider substrate 220 can be made of a material such as AlTiC or $SiO_2$. Further, the solder layer 58 is preferably made of an alloy containing one element selected from the group consisting of Au (gold), Ag (silver), Cu (copper), Ge (germanium), Al (aluminum) and Mg (magnesium) that has a melting point of lower than 400° C. The thickness of the solder layer 58 may be in the range of approximately 0.05 to 5.0 micrometers (μm), for example.

As also shown in FIG. 3a, in the slider 22, the head element part 221 formed on the element-integration surface 2202 of the slider substrate 220 includes: a head element 32 constituted of a magnetoresistive (MR) element 33 for reading data from the magnetic disk 10 (FIG. 1) and an electromagnetic transducer 34 for writing data to the magnetic disk; a spot-size converter 43 that receives a laser light emitted from the laser diode 40, changes (reduces) the spot size of the laser light, then guides the laser light into a waveguide portion 35; a waveguide portion 35 that guides the laser light with changed spot size to the head end surface 2210 as an opposed-to-medium surface or its vicinity; a surface plasmon generator 36 that generates near-field light (NF-light) for thermal assist; and an overcoat layer 38 formed on the element-integration surface 2202 so as to cover the head element 32, the spot-size converter 43, the waveguide portion 35 and the surface plasmon generator 36. Here, the spot-size converter 43 and the waveguide portion 35 constitute a waveguide 31, and the waveguide 31 and the surface plasmon generator 36 constitute an optical system for generating NF-light in the head 21 (head element part 221).

Further, the slider 22 includes a pair of terminal electrodes 370 and a pair of terminal electrodes 371, which are provided for the head element 32, formed on the back end surface 2211 of the head element part 221, the back end surface 2211 being on the side opposite to the opposed-to-medium surface (head end surface) 2210. Further, the light source unit 23 includes a terminal electrode 410 connected electrically to an n-electrode layer 40a of the laser diode 40 and provided on the source-installation surface 2302. The light source unit 23 further includes a terminal electrode 411 connected electrically to a p-electrode layer 40i of the laser diode 40 and provided on the p-electrode layer 40i. These terminal electrodes 370, 371, 410 and 411 are electrically connected to the connection pads of the wiring member 203 provided on the flexure 201 by wire bonding, by solder ball bonding (SBB) or the like.

One ends of the MR element 33, the electromagnetic transducer 34 and the surface plasmon generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk 10 with a predetermined flying height. Thus, the ends of the MR element 33 and electromagnetic transducer 34 face the surface of the magnetic record layer of the magnetic disk 10 with an appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide portion 35, is changed into NF-light in the surface plasmon generator 36. Then, a portion to be written of the magnetic recording layer is irradiated and thus heated with the NF-light. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 3a, a spot-size converter 43 is an optical element which receives laser light emitted from the laser diode 40 at its light-receiving end surface 430 having a width $W_{SC}$ in the track width direction (the Y-axis direction), converts the laser light to laser light with a smaller spot diameter with a low loss while maintaining a single mode, and then guides the converted laser light to a light-receiving end surface 352 of the waveguide portion 35. Here, the single-mode is a mode in which the laser light propagating within the spot-size converter 43 has a beam cross-section with a shape of circle or ellipsoid, and the light intensity distribution in the cross-section is single-peaked, especially a Gaussian. Laser light with a single mode can become a stable laser light with an intended intensity even in the case that the spot size of the laser light is converted into a smaller one due to the propagation through the spot-size converter 43. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide portion 35.

The waveguide portion 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide portion 35 near the end surface 350 faces a surface plasmon generator 36. This allows laser light (waveguide light) incident through the light-receiving end surface 352 and traveling through the waveguide portion 35 to reach the portion facing the surface plasmon generator 36, thereby to be coupled with the generator 36 in a surface plasmon mode.

As also shown in FIG. 3a, the light-receiving end surface 430 of the spot-size converter 43 (waveguide 31) is preferably inclined at a predetermined acute angle, for example at an angle of approximately 4° (degrees) with respect to the end surface 400 including the light-emitting center 4000 of the laser diode 40. Such angle prevents laser light reflected by the light-receiving end surface 430 from returning to the light-emitting center 4000. The spot-size converter 43 is made of a material (such as a dielectric material) with a refractive index higher than the refractive index $n_{OC}$ of the constituent material of the surrounding overcoat layer 38, and can be made of the same material (such as a dielectric material) as the waveguide portion 35, which will be described later. In the case, the spot-size converter 43 and the waveguide portion 35 may be formed integrally as a waveguide 31. Here, the spot-size converter 43 and the waveguide portion 35 (waveguide 31) function as a core, and the surrounding overcoat layer 38 acts as a clad.

The constituent materials of the spot-size converter 43 (waveguide 31) and the overcoat layer 38 are selected so that a first light passes through the constituent materials sufficiently, the first light being used for aligning the slider 22 and the light source unit 23 as described later, and thus an image of the light-receiving end surface 430 can be formed with the passing-through light. For example, in the case that the first light for aligning is an infrared light with a wavelength λ=800 μm, the spot-size converter 43 (waveguide 31) may be formed of, for example, a dielectric material such as $SiO_XN_Y$, $Ta_2O_5$, and the overcoat layer 38 may be formed of a dielectric material such as $Al_2O_3$.

The width $W_{SC}$ of the spot-size converter 43 (waveguide 31) at the light-receiving end surface 430 may be in the range of approximately 1 to 10 μm, for example. The thickness $T_{SC}$ (in Z-axis direction) at the light-receiving end surface 430 may be in the range of approximately 1 to 10 μm, for example. The area $W_{SC} \times T_{SC}$ of the core region and the contrast by refractive index difference between the spot-size converter 43 (waveguide 31) and the overcoat layer 38 determine the image of the light-receiving end surface 430 in image recognition for aligning the slider 22 and the light source unit 23 as explained in detail later.

Referring also to FIG. 3a, a unit electrode 4100 is provided on the source-installation surface 2302 of the unit substrate 230 of the light source unit 23. The unit electrode 4100 may be formed by a foundation layer of a material such as Ta or Ti with a thickness of approximately 10 nm (nanometers), for example, and a conducting layer of a conductive material such as Au, Cu or an alloy of Au with a thickness in the range of approximately 1 to 5 μm, for example. In an alternative, the unit electrode 4100 may be formed by depositing a solder material such as Au—Sn alloy on the source-installation surface 2302 by an evaporation method, for example. The terminal electrode 410 is electrically connected with the n-electrode layer 40a of the laser diode 40 through the unit electrode 4100, the n-electrode layer 40a being connected with the unit electrode 4100. The terminal electrode 411 may be a conductive layer formed on the p-electrode layer 40i of the laser diode 40, and made of, for example, Au, Cu or Au alloy with a thickness in the range of approximately 1 to 5 μm. When a predetermined voltage is applied between the n-electrode layer 40a and a p-electrode layer 40i of the laser diode 40 through these terminal electrodes 410 and 411, the laser diode 40 oscillates and laser light is emitted from the light-emitting center 4000.

The constituent materials of the laser diode 40 are selected so that a second light passes through the constituent materials sufficiently, the second light being used for aligning the slider 22 and the light source unit 23 as described later, and thus an image of the light-emitting end surface 4000 can be formed with the passing-through light. For example, in the case that the second light for aligning is an infrared light with a wavelength λ=800 μm, the laser diode 40 may be formed of, for example, a GaAs-based semiconductor material. In the case, a laser diode can be utilized, which are usually used for communication, optical disk storage, or material analysis.

As shown in FIG. 3b, the laser diode 40 has a multilayered structure in which sequentially stacked from the unit substrate 230 side is: an n-electrode layer 40a having a surface contact and bonded with the unit electrode 4100; an n-GaAs substrate 40b; an n-GaAs block layer 40c; an n-clad layer 40d; an active layer 40e formed of multiquantum well or the like; a p-clad layer 40f; an p-GaAs layer 40g; and a p-electrode layer 40i. In these layers, the n-clad layer 40d, the active layer 40e and the p-clad layer 40f constitutes a ridge structure sandwiched between portions of n-GaAs block layer 40c; thus an light-emission region is limited since the active layer 40e falls within the ridge. Here, the light-emitting end surface 4000 is a part of end surface of the ridge including the light-emitting center 4000a. The ridge structure has a size, that is, a width $W_{RG}$ of 1 to 2 μm and a height $T_{RG}$ of 1 to 2 μm in the light-emitting end surface 4000, for example.

The n-electrode layer 40a and the p-electrode layer 40i may be formed of, for example, Au or Au alloy with thickness of approximately 5 μm. Alternatively, the p-electrode layer

40i may be bonded to the unit electrode 4100 by turning the laser diode 40 upside down. Further, on the front and rear cleaved surfaces of the multilayered structure of the laser diode 40, respectively formed are reflective layers 510 and 511 for exciting the oscillation by total reflection. The laser diode 40 has a width $W_{LA}$ of, for example, approximately 150 to 250 µm. The length $L_{LA}$ of the laser diode 40 corresponds approximately to a cavity length that is the distance between the reflective layers 510 and 511, and is, for example, 300 µm. The length $L_{LA}$ is preferably 300 µm or more in order to obtain a sufficient high output. Further, the height $T_{LA}$ of the laser diode 40 is, for example, approximately 60 to 200 µm.

An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. Even in the case that the amount of electric power consumption of the laser diode 40 is, for example, in the vicinity of one hundred mW, the amount can be covered sufficiently by the electric source provided within the magnetic disk apparatus.

Referring again to FIG. 3a, the n-electrode layer 40a of the laser diode 40 and the unit electrode 4100 of the unit substrate 230 can be bonded to each other by soldering using one of lead-free solders such as Au—Sn alloy 52. Here, preferably the laser diode 40 is bonded onto the unit substrate 230 in such a way that the distance $D_{REC}$ (in X-axis direction) between the light-emitting surface 400 of the laser diode 40 and the joining surface 2300 is 0 or more, and 5 µm or less. Since the distance $D_{REC}$ is greater than or equal to 0, the laser diode 40 does not protrude from the light source unit 23. Consequently, the laser diode 40 is prevented from being subjected to excessive mechanical stress and damage during bonding. Furthermore, since the direction $D_{REC}$ is less than or equal to 5 µm, the distance between the light-emitting center 4000 and the light-receiving end surface 430 of the waveguide 31 of the slider 22 is sufficiently small and therefore a high light use efficiency can be provided.

As also shown in FIG. 3a, the slider substrate 220 is, for example, a so-called Femto slider having a thickness (in X-axis direction) $T_{SL}$ of 230 µm, a width $W_{SL}$ of 700 µm in the track width direction (Y-axis direction), and a length $L_{SL}$ (in Z-axis direction) of 850 µm. The Femto slider is commonly used as the substrate of a thin-film magnetic head capable of achieving a high recording density and is the smallest in standardized size among the currently used sliders. On the other hand, the unit substrate 230 is somewhat smaller than the slider substrate 220. In particular, the width $W_{UN}$ of the unit substrate 230 in the track width direction (Y-axis direction) is preferably larger than or equal to the width $W_{LA}$ of the laser diode 40 in the track width direction (Y-axis direction), and is preferably smaller than the width $W_{SL}$ of the slider substrate 220. Further, the length $L_{UN}$ (in Z-axis direction) of the unit substrate 230 is preferably smaller than the length $L_{SL}$ of the slider substrate 220. The width/length setting enables a laser light for melting the solder layer 58 and bonding the light-source unit 23 and the slider 22 to reach the solder layer 58 without irradiating and heating the slider substrate 220 with the laser light, as described in detail later. Considering the requirements described above, the unit substrate 230 may have a thickness $T_{UN}$ (in X-axis direction) of 320 µm, a width W in the track width direction of 350 µm, and a length L (in Z-axis direction) of 250 µm, for example.

As described above, the thermally-assisted magnetic recording head 21 has the structure in which the slider 22 and the light source unit 23 are interconnected. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, the reduction of production yield of the entire heads due to the rejection rate of the laser diodes 40 can be avoided. Furthermore, since the light source unit 23 is attached to the back surface 2201 of the slider 22 which is opposite to the ABS 2200 of the slider 22, the laser diode 40 can be always disposed in a location far from the ABS 2200. As a result, direct mechanical impact on the laser diode 40 in operation can be avoided. Moreover, since the ABS 2200 of the slider 22 is perpendicular to the element-integration surface 2202, the slider 22 has a high affinity for conventional thin-film magnetic head fabrication processes. Since an optical part that requires a considerably high accuracy such as an optical pickup lens or an optical part that requires a special structure for connection such as an optical fiber do not need to be provided in the thermally-assisted magnetic recording head 21, the number of man-hours and thus costs can be reduced.

Figure 4:
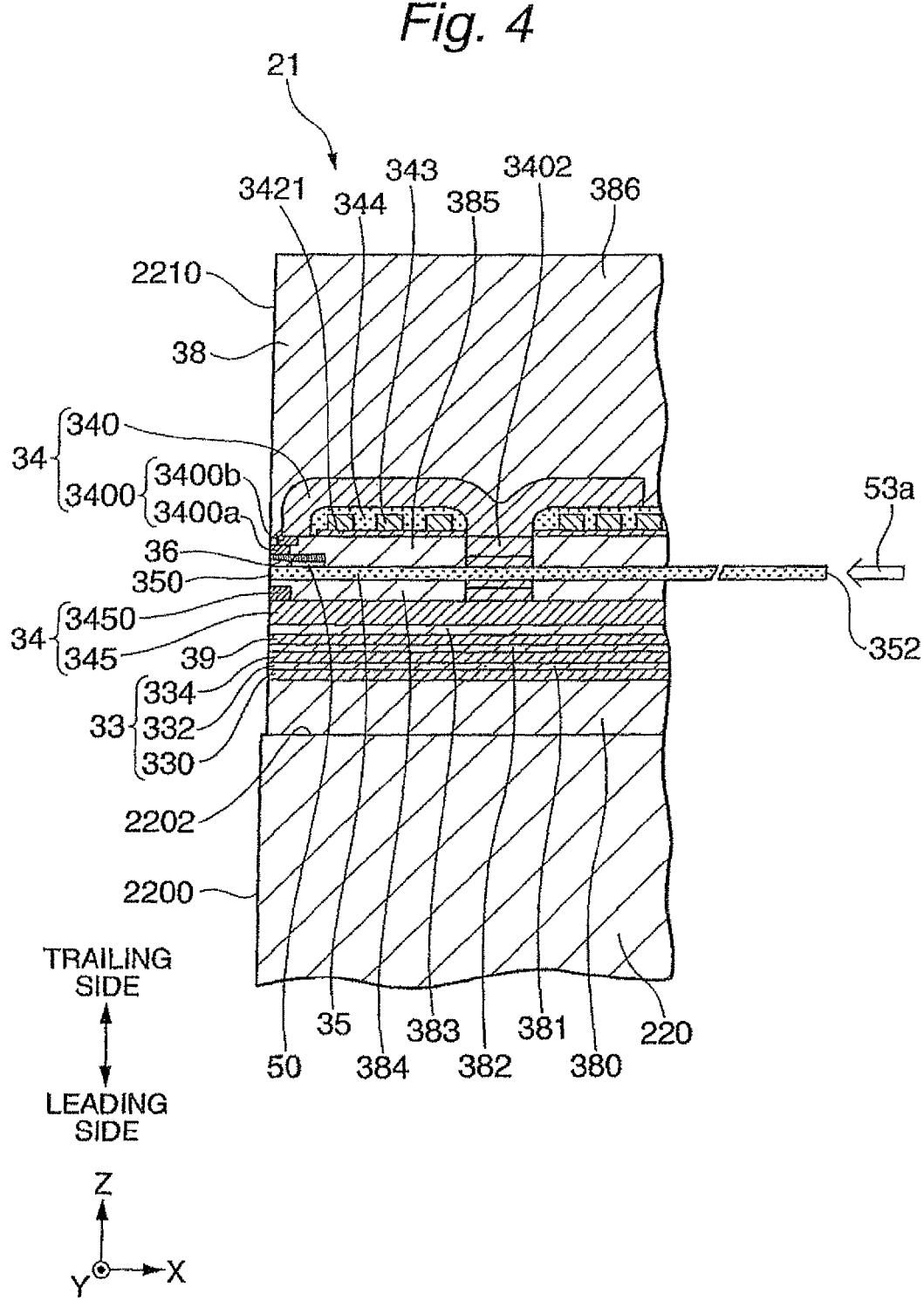
FIG. 4 shows a cross-sectional view taken by plane A in FIG. 3a, schematically illustrating the configuration of the head element and its vicinity in the thermally-assisted magnetic recording head.
Figure 5:
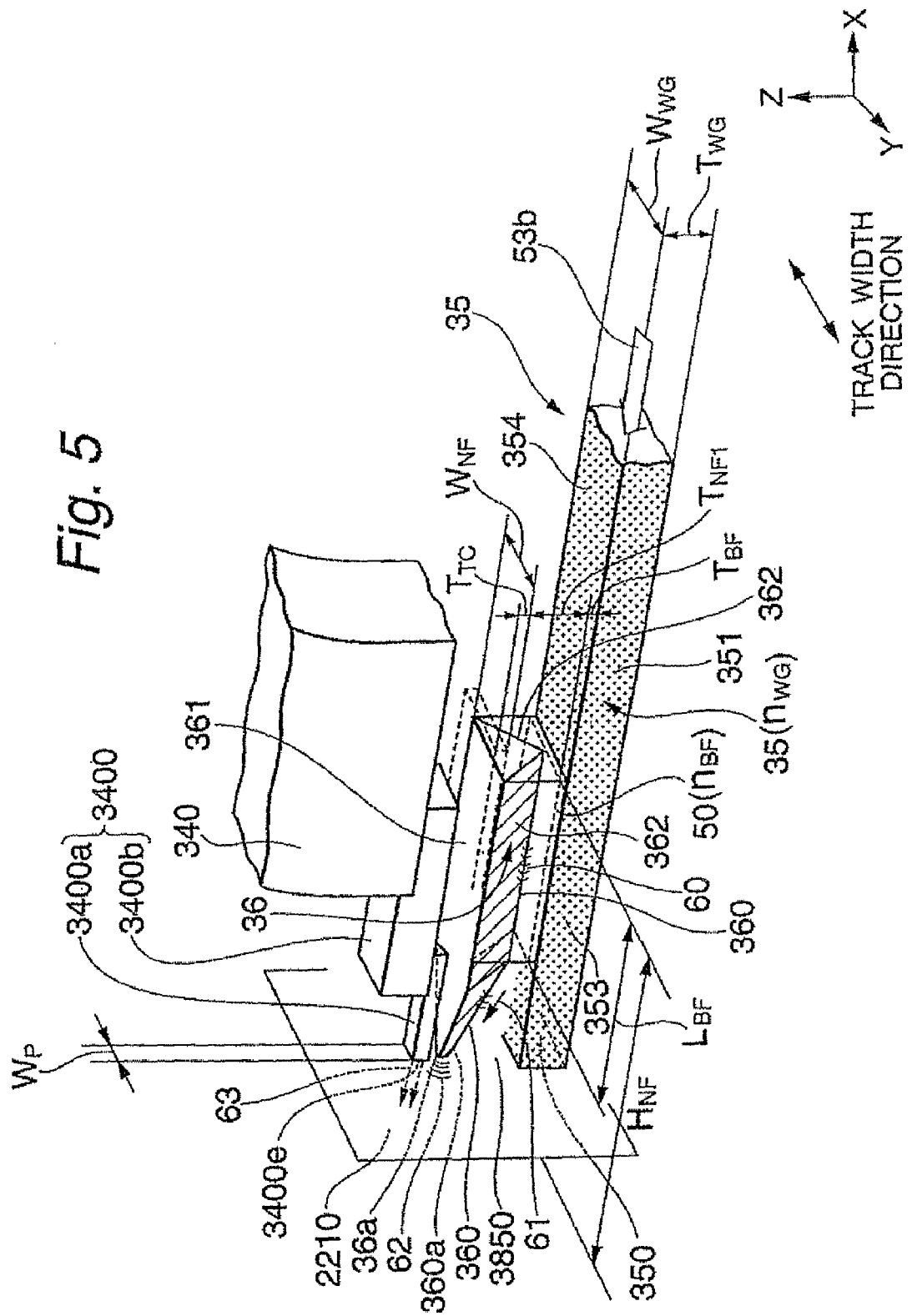
FIG. 5 shows a perspective view schematically illustrating the configuration of the waveguide portion, the surface plasmon generator and the main magnetic pole.

FIG. 4 shows a cross-sectional view taken by plane A in FIG. 3a, schematically illustrating the configuration of the head element 32 and its vicinity in the thermally-assisted magnetic recording head 21. And FIG. 5 shows a perspective view schematically illustrating the configuration of the waveguide portion 35, the surface plasmon generator 36 and the main magnetic pole 3400. In FIG. 5, the head end surface 2210 is positioned at the left side, the surface 2210 including positions where write field and NF-light are emitted toward the magnetic recording medium.

As shown in FIG. 4, the MR element 33 is formed on a base layer 380 that is formed of an insulating material such as $Al_2O_3$ (alumina), $SiO_2$ and stacked on the element-integration surface 2102. The MR element 33 includes: an MR multilayer 332; and a lower shield layer 330 and an upper shield layer 334 which sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GNR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. In the case that the MR multilayer 332 is a CPP-GMR multilayer or a TMR multilayer, the upper and lower shield layers 334 and 330 act as electrodes as well as magnetic shields.

Referring also to FIG. 4, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 1), the magnetic flux being excited by write current flowing through the write coil layer 343. The main magnetic pole 3400 includes: a first main pole portion 3400a reaching the head end surface 2210 and having a small width $W_P$ (FIG. 6) in the track width direction; and a second main pole portion 3400b located on the first main pole portion 3400a and at the rear (+X side) of the portion 3400a. The first main pole portion 3400a has an end surface 3400e (FIG. 5) with a shape of, for example, a rectangle, a square or a trapezoid on the head end surface 2210. Here, the above-described width $W_P$ is the length of an edge in the track width direction (Y-axis direction) of the end surface 3400e, and defines the width of write field distribution in the track width direction (Y-axis direction). The width $W_P$ can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 5, and may be, for example, in the range from two to seven.

The back contact portion 3402 has a though-hole extending in X-axis direction, and the waveguide portion 35 and insulating layers that covers the waveguide portion 35 pass through the though-hole. In the though-hole, the waveguide portion 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Further, also as shown in FIG. 4, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

Referring also to FIG. 4, laser light 53a, the spot size of which the spot-size converter 43 changes (reduces), enters the waveguide portion 35 from the light-receiving end surface 352, and propagates through the waveguide portion 35. The waveguide portion 35 extends from the light-receiving end surface 352 to the end surface 350 on the head end surface 2210 side through the through-hole that is provided in the back contact portion 3402 and extends in X-axis direction. As shown in FIG. 5, the waveguide portion 35 propagates the laser light (waveguide light) 53b for generating NF-light toward the end surface 350. The surface plasmon generator 36 includes a propagative edge 360 on which surface plasmon excited by the waveguide light 53b propagates, and is a near-field generator (NF-generator) that transforms the waveguide light 53b into NF-light. A portion of the waveguide portion 35 on the head end surface 2210 side and the surface plasmon generator 36 are provided, as shown in FIG. 4, between the lower shield 3450 (lower yoke layer 345) and the main magnetic pole 3400 (upper yoke layer 340).

Further, as shown in FIG. 5, the surface plasmon generator 36 further includes a near-field light generating (NFL-generating) end surface 36a that reaches the head end surface 2210 and is a destination for the excited surface plasmon. The propagative edge 360 extents to the NFL-generating end surface 36a. Further, a buffering portion 50 is a portion sandwiched between a portion of the side surface 354 of the waveguide portion 35 and a portion of the lower surface 362 including the propagative edge 360 of the surface plasmon generator 36. That is, the propagative edge 360 is covered with the buffering portion 50. The buffering portion 50 acts for coupling the waveguide light 53b with the surface plasmon generator 36 in a surface plasmon mode. Further, the propagative edge 360 plays a role of propagating the surface plasmon excited by the waveguide light 53b to the NFL-generating end surface 36a. Here, side surfaces of the waveguide portion 35 are defined as, out of end surfaces surrounding the waveguide portion 35, end surfaces other than the end surface 350 on the head end surface 2210 side and the light-receiving end surface 352 on the opposite side. These side surfaces serve as surfaces on which the propagating waveguide light 53b can be totally reflected in the waveguide portion 35 that corresponds to a core. In the present embodiment, the side surface 354 of the waveguide portion 35, a portion of which is in surface contact with the buffering portion 50, is the upper surface of the waveguide portion 35. And, the buffering portion 50 may be a portion of the overcoat layer 38 (FIG. 3), or may be provided as a new layer other than the overcoat layer 38.

Specifically, the waveguide light 53b, which has advanced to near the buffering portion 50, is involved with the optical configuration including the waveguide portion 35 with a refractive index $n_{WG}$, the buffering portion 50 with a refractive index $n_{BF}$ and the surface plasmon generator 36 made of a metal, and induces a surface plasmon mode on the propagative edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide portion 35 ($n_{BF} < n_{WG}$).

Actually, evanescent light is excited within the buffering portion 50 under an optical boundary condition between the waveguide portion 35 as a core and the buffering portion 50. Then, the evanescent light couples with the fluctuation of electric charge excited on the metal surface (propagative edge 360) of the surface plasmon generator 36, and induces the surface plasmon mode, thereby there is excited surface plasmon 60. Here, the propagative edge 360 is located closest to the waveguide portion 35 on the inclined lower surface 362 of the surface plasmon generator 36, and is just an edge where electric field tends to converge; thus surface plasmon can easily be excited on the edge 360. The propagative edge 360 is preferably made rounded to prevent surface plasmon 60 from running off from the edge 360, and thus to prevent the degradation of light use efficiency.

In the light source and optical system as shown in FIGS. 3a, 4 and 5, the laser light emitted from the light-emission surface 400 of the laser diode 40 preferably has TM-mode polarization in which the oscillation direction of electric field of the laser light is along Z-axis. Further, the waveguide light 53b accordingly have a linear polarization in which the oscillation direction of electric field of the laser light is Z-axis direction, that is, perpendicular to the layer surface of the waveguide portion 35. Setting the polarization enables the waveguide light 53b propagating through the waveguide portion 35 to be coupled with the surface plasmon generator 36 in a surface plasmon mode.

Further, as shown also in FIG. 5, the surface plasmon generator 36, in the present embodiment, tapers in the height direction (Z-axis direction) near the head end surface 2210 toward the NFL-generating end surface 36a. Further, the surface plasmon generator 36 has, in the present embodiment, a cross-section taken by YZ plane with a triangular shape, and the NFL-generating end surface 36a especially has an isosceles triangle shape in which one apex on the leading side (-Z side) is the end of the propagative edge 360. Thus, surface plasmon 60 propagating on the propagative edge 360 reaches the NFL-generating end surface 36a having an apex 360a as a destination of the edge 360. As a result, the surface plasmon 60, namely, electric field converges in the NFL-generating end surface 36a. Thereby NF-light 62 is emitted from the end surface 36a toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, the side surfaces of the waveguide portion 35: the upper surface 354, the lower surface 353, and both the side surfaces 351 in the track width direction (Y-axis direction) have a surface contact with the overcoat layer 38 (FIG. 3a), that is, the insulating layers 384 and 385 (FIG. 4), except a portion having a surface contact with the buffering portion 50. Here, the waveguide portion 35 is formed of a material with a refractive index $n_{WG}$ higher than the refractive index $n_{OC}$ of the constituent material of the overcoat layer 38, made by using, for example, a sputtering method. This material design causes the waveguide portion 35 to act as a core, and causes the overcoat layer 38 to act as a clad. Further, in the present embodiment, the waveguide portion 35 has a cross-section taken by YZ-plane of a rectangular or trapezoidal shape. The width $W_{WG}$ in the track width direction (Y-axis direction) of a portion of the waveguide portion 35 near the end surface 350 on the head end surface 2210 side may be, for example, in the range approximately from 0.3 to 0.7 μm. Further, the thickness $T_{WG}$ (in Z-axis direction) of the waveguide portion 35 may also be, for example, in the range approximately from 0.3 to 0.7 μm.

The buffering portion 50 is formed of a dielectric material having a refractive index $n_{BF}$ lower than the refractive index $n_{WG}$ of the waveguide portion 35. For example, when the wavelength $\lambda_L$ of the laser light is 600 nm and the waveguide portion 35 is formed of $SiO_XN_Y$ ($n_{WG}$=1.7 to 1.85) or $Ta_2O_5$ ($n_{WG}$=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide portion 35 and the propagative edge 360, is preferably in the range of 0.5 to 5 μm, and is preferably larger than the wavelength 4 of the laser light 53b. Further, the thickness $T_{BF}$ (in Z-axis direction) of the buffering portion 50 is preferably in the range of 10 to 200 nm.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_1$ being in the range of, for example, approximately 10 to 100 nm. Further, the length (height) $H_{NF}$ (in X-axis direction) can be set to be in the range of, for example, approximately 0.8 to 6.0 μm.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 6:
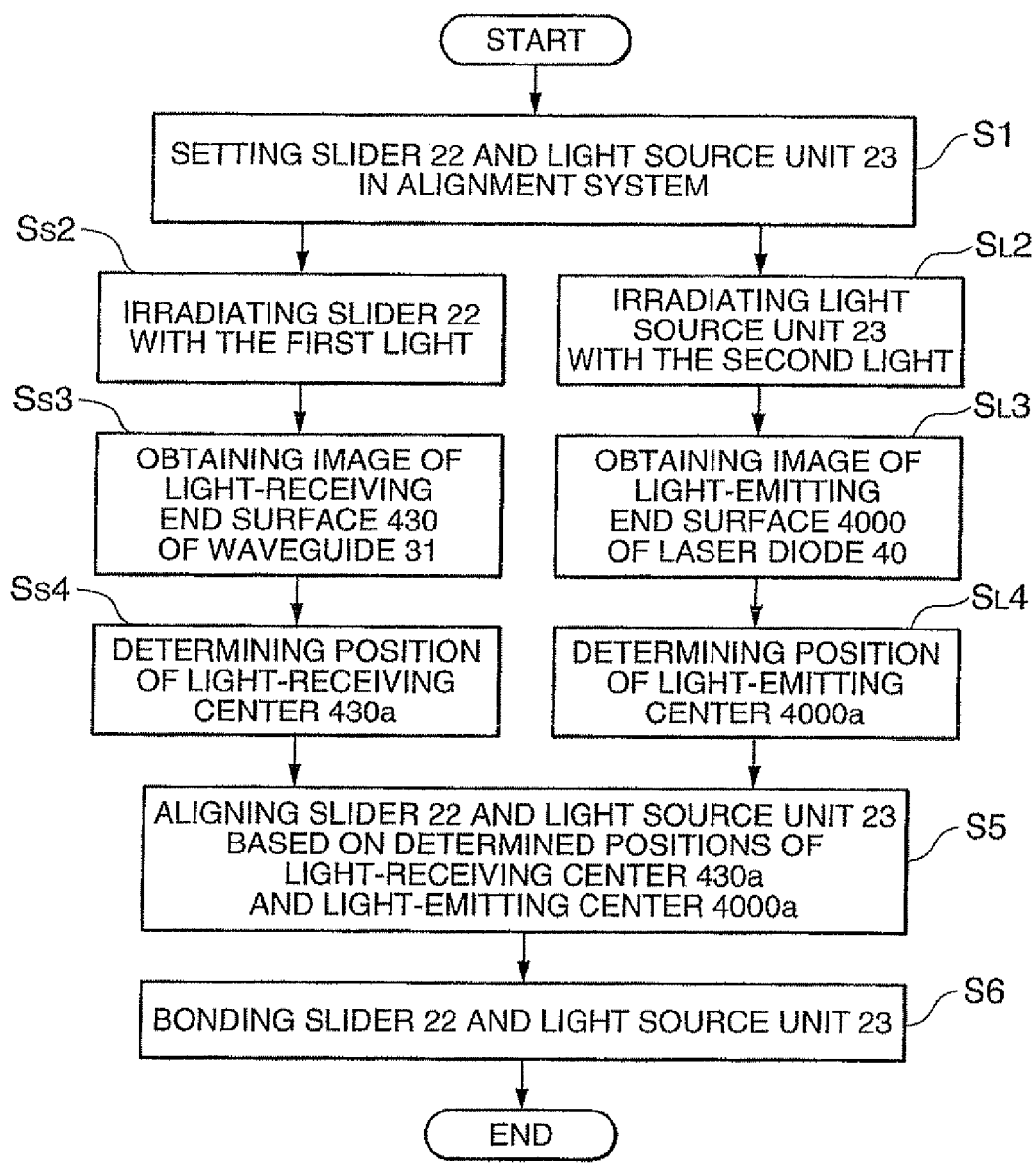
FIG. 6 shows a flowchart schematically illustrating an embodiment of a method for manufacturing the thermally-assisted magnetic recording head in which a slider and a light source unit are joined together according to the present invention.

FIG. 6 shows a flowchart schematically illustrating an embodiment of a method for manufacturing the thermally-assisted magnetic recording head 21 in which a slider 22 and a light source unit 23 are joined together according to the present invention.

The flowchart of FIG. 6 illustrates a process of aligning the slider 22 and the light source unit 23 with each other (steps S1 to S5) and then bonding them together (S6). As illustrated in FIG. 3a, the slider 22 is provided on the element-integration surface 2202 of a slider substrate 220 and includes a waveguide 31 having a light-receiving end surface 430 extending to the back surface 2211 on the side opposite to the head end surface 2210. Also as illustrated in FIG. 3a, the light source unit 23 is provided on the source-installation surface 2302 of a unit substrate 230 and includes a laser diode 40 having a light-emitting end surface 4000 positioned on the joining surface 2300 side. The slider 22 and the light source unit 23 are aligned with each other on the basis of determined positions of a light-receiving center 430a and a light-emitting center 4000a. An overview of the aligning process and the bonding process will be given below.

Referring to FIG. 6, first the slider 22 and the light source unit 23 are set in an alignment system in such a manner that the light-emitting end surface 4000 of the laser diode 40 can move parallel to a reference plane 70 (FIG. 7) including the back surface 2201 of the slider 22 to a position in which the light-emitting end surface 4000 faces the light-receiving end surface 430 of the waveguide 31 (step S1).

Then, the waveguide 31 is irradiated with a first light such as infrared light from the ABS 2000 side of the slider 22 (step $S_S2$), and the first light that has passed through the slider 22 is detected on the back surface 2201 side of the slider 22 to obtain an image of the light-receiving end surface 430 (step $S_S3$). Then, the position of the light-receiving center 430a in the light-receiving end surface 430 is determined from the obtained image of the light-receiving end surface 430 (step $S_S4$).

On the other hand, laser diode 40 is irradiated with a second light such as infrared light from the side opposite to the joining surface 2300 of the light source unit 23 (step $S_L2$), and the second light that has passed through the light source unit 23 is detected on the joining surface 2300 side of the light source unit 23 to obtain an image of the light-emitting end surface 4000 (step $S_L3$). Then, the position of the light-emitting center 4000a in the light-emitting end surface 4000 is determined from the obtained image of the light-emitting end surface 4000 (step $S_L4$).

Then, based on the determined positions of the light-receiving center 430a and the light-emitting center 4000a, the slider 22 and the light source unit 23 are moved with respect to each other in such a way that the light-emitting end surface 4000 moves parallel to the reference plane 70 (FIG. 7) to align the slider 22 and the light source unit 23 with each other (step S5). Lastly, the slider 22 and the light source unit 23 are bonded to each other in such a manner that the back surface 2201 and the joining surface 2300 join together. With this, the fabrication of the thermally-assisted magnetic recording head 21 has been completed.

Figure 7:
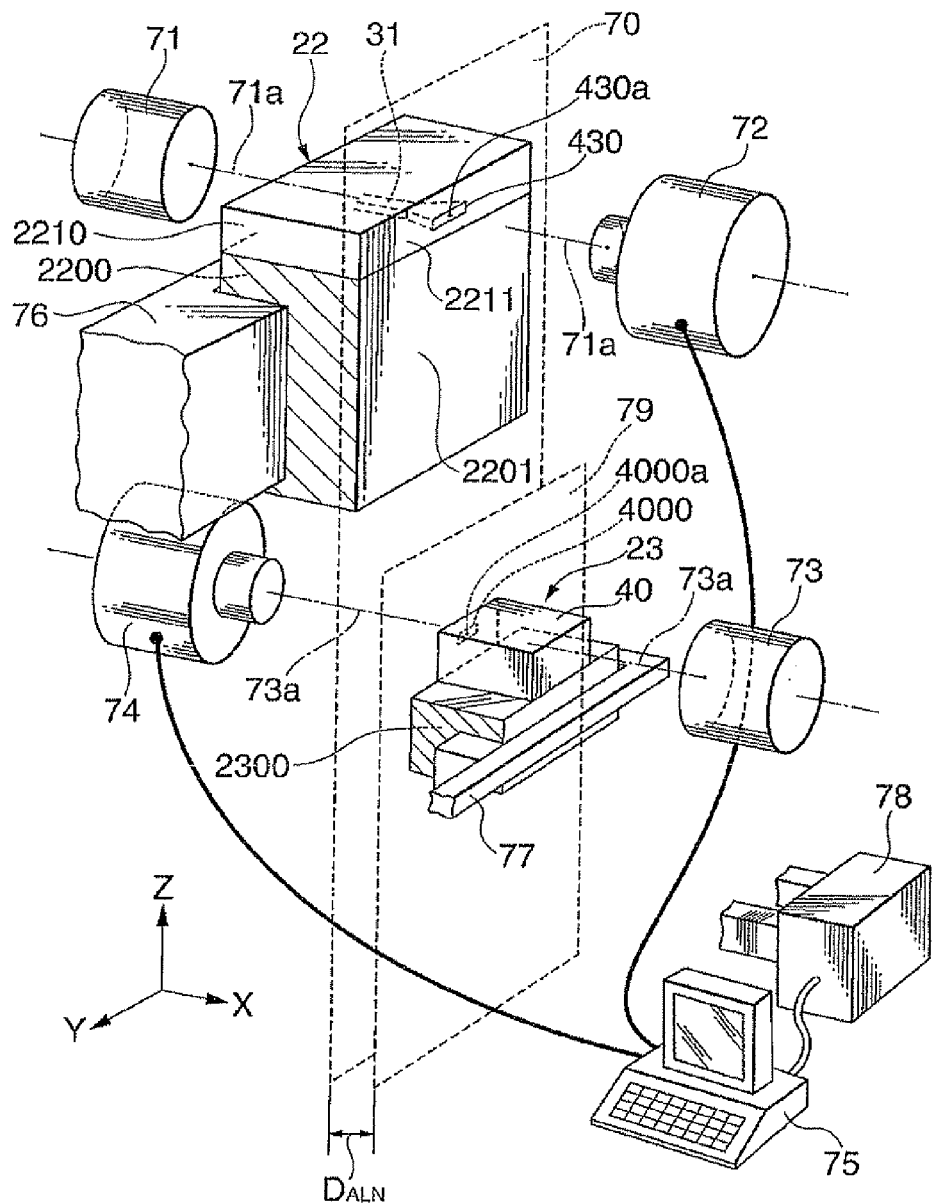
FIG. 7 shows a schematic view for explaining steps S1, $S_S2$ to $S_S4$, and $S_L2$ to $S_L4$ (FIG. 6) in one embodiment of the method for manufacturing the thermally-assisted magnetic recording head according to the present invention.
Figure 8A:
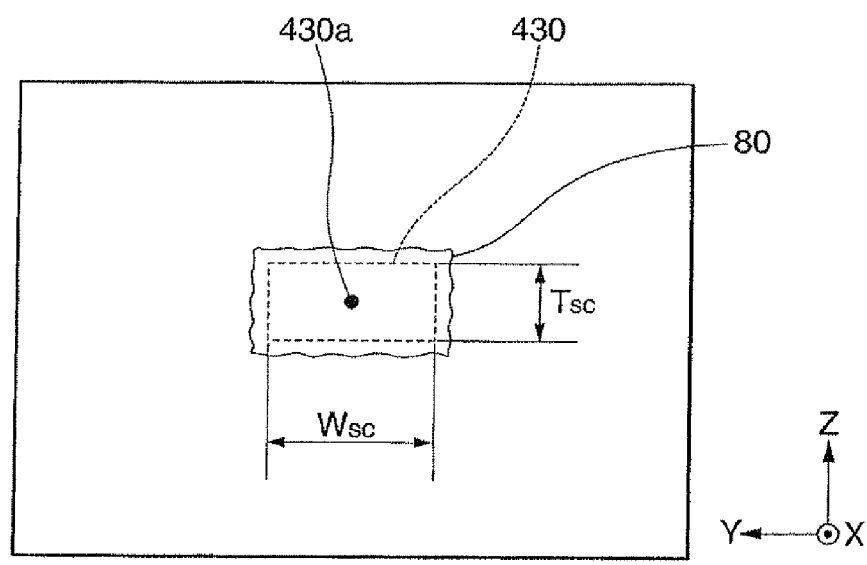
FIGS. 8a and 8b show schematic views for explaining steps S1, $S_S2$ to $S_S4$, and $S_L2$ to $S_L4$ (FIG. 6) in one embodiment of the method for manufacturing the thermally-assisted magnetic recording head according to the present invention.
Figure 8B:
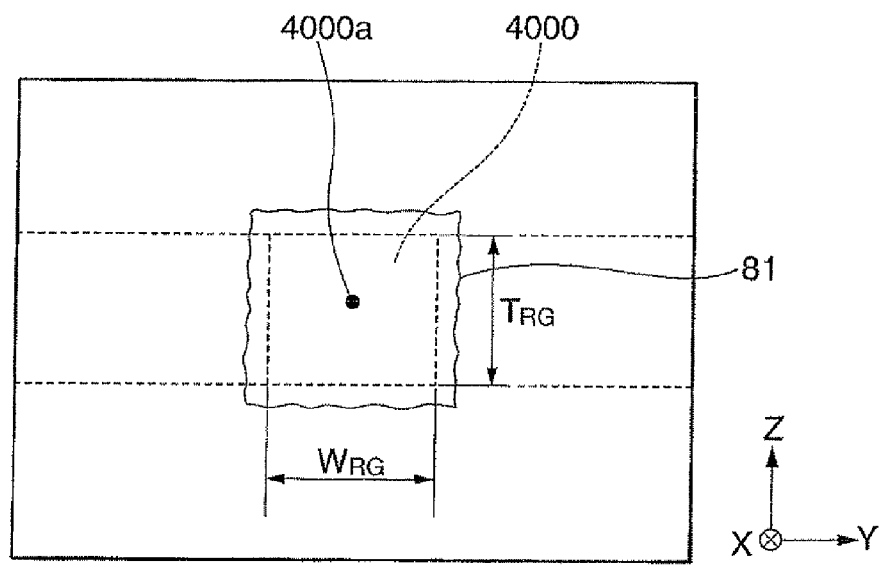

FIG. 7 and FIGS. 8a and 8b show schematic views for explaining steps S1, $S_S2$ to $S_S4$, and $S_L2$ to $S_L4$ (FIG. 6) in one embodiment of the method for manufacturing the thermally-assisted magnetic recording head 21 according to the present invention.

Referring to FIG. 7, first, components of the alignment system are placed. The components are: a first infrared light source 71 emitting the first infrared light; a first infrared camera 72, which is a first photodetector detecting the first infrared light; a second infrared light source 73 emitting the second infrared light; and a second infrared camera 74, which is a second photodetector detecting the second infrared light. The light-emitting end surface of the first infrared light source 71 is opposed to the light-receiving end surface of the first infrared camera 72, and the light-emitting end surface of the second infrared light source 73 is opposed to the light-receiving end surface of the second infrared camera 74. Preferably, the optical axis 71a passing through the first infrared light source 71 and the first infrared camera 72 and the optical axis 73a passing through the second infrared light source 73 and the second infrared camera 74 are parallel to each other. The first infrared light source 71 (and the first infrared camera 72) and the second infrared light source 73 (and the second infrared camera 74) are on the opposite sides to each other with respect to the reference plane 70 located between the light sources and the cameras.

The first infrared light has a wavelength that passes through the material of the waveguide 31. The wavelength may be in the range of 700 to 2000 nm, for example 800 nm, if the waveguide 31 is made of a dielectric material such as $TaO_X$ or $SiO_XN_Y$, for example. In this case, the first infrared light source may be a light-emitting diode (LED), a laser diode (LD), or a lamp light source provided with a filter. The second infrared light has a wavelength that passes through the material of the laser diode 40. The wavelength may be in the range of 700 to 2000 nm, for example 800 nm, if the laser diode 40 is made of a GaAs-based semiconductor material. The second infrared light source may also be a light-emitting diode (LED), a laser diode (LD), or a lamp light source provided with a filter. The first infrared camera 72 and the second infrared camera 74 may be commercially available infrared cameras. Signals output from the first and second infrared cameras 72 and 74 are transmitted to an image analysis system 75. The image analysis system 75 forms images from the signals provided, analyzes the images, and controls a drive unit 78 driving alignment jigs 76 and 77 on the basis of the analysis result. The light sources 71 and 73, the cameras 72 and 74, the image analysis system 75, the drive unit 78, and the alignment jigs 76 and 77 make up the alignment system of the present embodiment.

Referring again to FIG. 7, the slider 22 is then placed between the first infrared light source 71 and the first infrared camera 72. The slider 22 is placed in such a manner that the head end surface 2210 (ABS 2200) of the slider 22 faces the first infrared light source 71 and the back surface 2211 (back surface 2201) of the slider 22 faces the first infrared camera 72. The slider 22 is held with the alignment jig 76 and can be moved by the drive unit 78 to any desired position with a high accuracy. The light source unit 23, on the other hand, is placed between the second infrared light source 73 and the second infrared camera 74. The light source unit 23 is placed in such a manner that the surface of the laser diode 40 on the side opposite to the light-emitting end surface 4000 faces the second infrared light source 73 and the surface including the light-emitting end surface 4000 faces the second infrared camera 74. The light source unit 23 is held with the alignment jig 77 and can be moved by the drive unit 74 to any desired position with a high accuracy.

The slider 22 and the light source unit 23 are positioned so that the light-emitting end surface 4000 of the laser diode 40 moves parallel to the reference plane 70 including the back surface 2201 (back surface 2211) of the slider 22 to a position in which the light-emitting end surface 4000 faces the light-receiving end surface 430 of the waveguide 31. In the present embodiment, the light-emitting end surface 4000 is parallel to the reference plane 70 (YZ plane). In this case, a unit plane 79 that includes the joining surface 2300 of the light source unit 23 is considered, and the reference plane 70 and the unit plane 79 are preferably set to be parallel to each other with a predetermined distance $D_{ALN}$ between them. Here, the reference plane 70 and the unit plane 79 are both parallel to YZ plane. With this setting, alignment between the light-receiving center 430a and the light-emitting center 4000a in YZ plane can be accomplished by moving, for example, the light source unit 23 in YZ plane with respect to the slider 22. The distance $D_{ALN}$ can be set to a value in the range of 1 to 10000 μm, for example.

Referring again to FIG. 7, then the first infrared light source 71 is used to irradiate the waveguide 31 with the first infrared light from the ABS 2000 side of the slider 22, and the first infrared light that has passed through the slider 22 is detected by using the first infrared camera 72 on the back surface 2201 side of the slider 22. On the other hand, the second infrared light source 73 is used to irradiate the laser diode 40 with the second infrared light from the side opposite to the joining surface 2300 of the light source unit 23, and the second infrared light that has passed through the light source unit 23 is detected by using the infrared camera 74 on the joining surface 2300 side of the light source unit 23. Then, signals of the detected first and second infrared lights are transmitted from the first and second infrared cameras 72 and 74, respectively, to the image analysis system 75.

The image analysis system 75 forms an image of the light-receiving end surface 430 as exemplified in FIG. 8a and an image of the light-emitting end surface 4000 as exemplified in FIG. 8b by image recognition with the received signals. The border of the image 80 in FIG. 8a does not necessarily matches the border of the light-receiving end surface 430, and can be somewhat blurred. However, the image 80 is defined by the size ($W_{SC} \times T_{SC}$) of the light-receiving end surface 430 and the contrast caused by the difference in refractive index between the waveguide 31 and the overcoat layer 38, and thus corresponds to the light-receiving end surface 430. Therefore, the image analysis system 75 uses the image 80 to determine the coordinates of the position of the light-receiving center 430a in YZ plane. Here, the image 80 may be approximated by a rectangle and the center of the rectangle may be set as the light-receiving center 430a, or the light intensity distribution of the image 80 may be obtained and the position of the peak of the distribution may be set as the position of the light-receiving center 430a.

Similarly, the image 81 in FIG. 8b is defined by the size ($W_{RG} \times T_{RG}$) of the light-emitting end surface 4000 and the contrast caused by the difference in refractive index between the light-emitting end surface 4000 (a ridge portion including the active layer 40e) and the semiconductor layers surrounding the light-emitting end surface 4000, and thus corresponds to the light-emitting end surface 4000. Therefore, the image analysis system 75 uses the image 81 to determine the coordinates of the position of the light-emitting center 4000a in YZ plane. Here, the image 81 may be approximated by a rectangle and the center of the rectangle may be set as the light-emitting center 4000a, or the light intensity distribution of the image 81 may be obtained and the position of the peak of the distribution may be set as the position of the light-emitting center 4000a.

Then, based on the determined coordinates of the position of the light-receiving center 430a in YZ plane and the coordinates of the position of the light-emitting center 4000a in YZ plane, the image analysis system 75 (FIG. 7) instructs the drive unit 78 to move the alignment jigs 76 and 77 to determined relative positions.

FIGS. 9a to 9d show schematic views illustrating step 5 (FIG. 6) of an embodiment of the method for manufacturing the thermally-assisted magnetic recording head 21 according to the present invention.

Figure 9A:
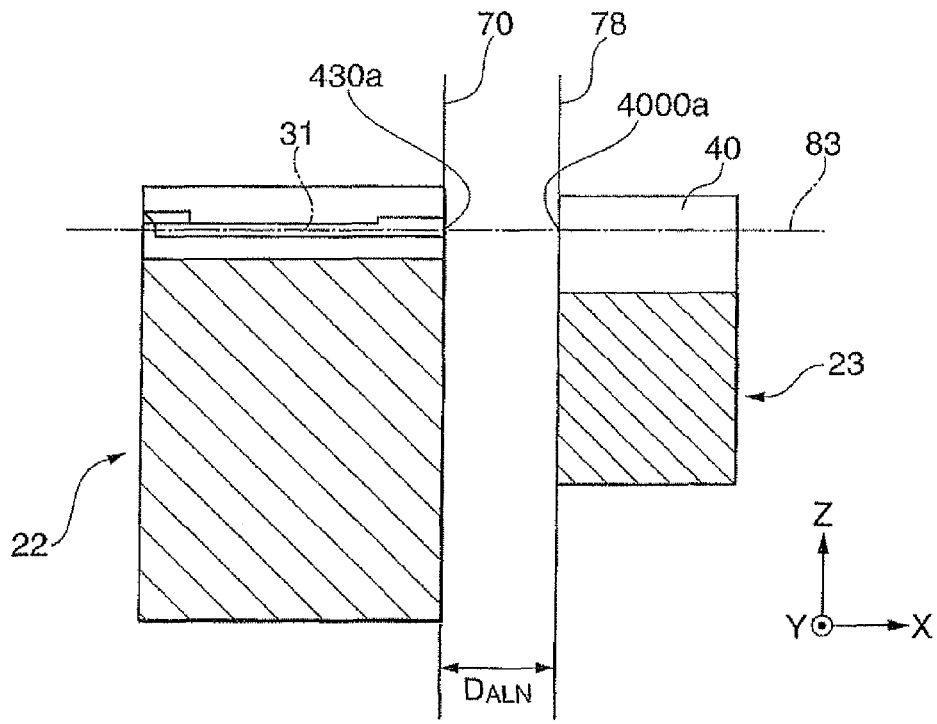
FIGS. 9a to 9d show schematic views illustrating step 5 (FIG. 6) of an embodiment of the method for manufacturing the thermally-assisted magnetic recording head according to the present invention.

The slider 22 and the light source unit 23 are moved by the drive unit 78 to relative positions illustrated in FIG. 9a with respect to each other. The relative positions of the slider 22 and the light source unit 23 are determined by moving the light source unit 23 (the light-emitting end surface 4000) shown in FIG. 7 parallel to the reference plane 70 until the light source unit 23 (the light emitting end surface 4000) faces the slider 22 (the light-receiving end surface 430). In FIG. 9a, the slider 22 and the light source unit 23 are at a distance D from each other, and the light-receiving center 430a and the light-emitting center 4000a are in a straight line 83 perpendicular to the reference plane 70 (the unit plane 79). That is, based on the determined coordinates of the position of the light-receiving center 430a in YZ plane and the determined coordinates of the position of the light-emitting center 4000a in YZ plane, the image analysis system 75 (FIG. 7) causes the drive unit 78 to move the light source unit 23 parallel in YZ plane until the Y and Z components of the coordinates of the two positions match each other, that is, the light-receiving center 430a and the light-emitting center 4000a are in a straight line 83.

Figure 9B:
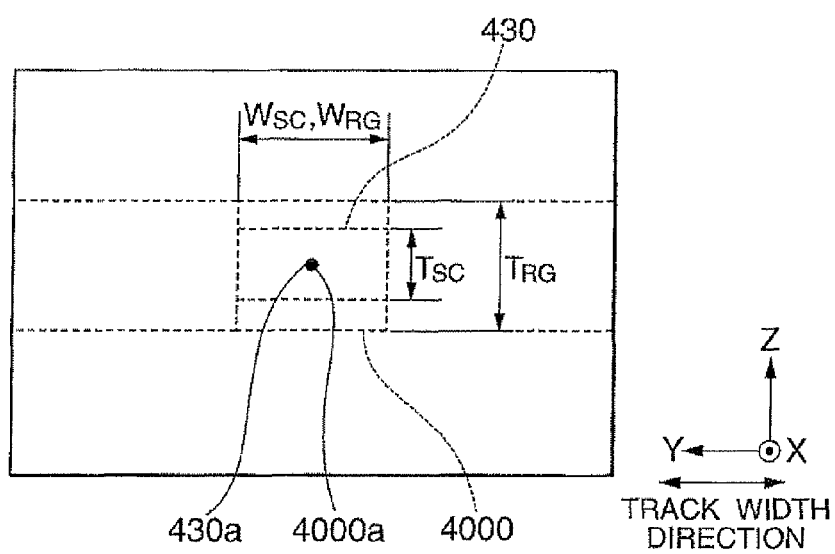

In this case, the light-receiving end surface 430 and the light-emitting end surface 4000 are overlapped with each other in YZ plane, and the light-receiving center 430a and the light-emitting center 4000a coincide with each other. If the light-receiving end surface 430 has $W_{SC}$ of 2.0 μm and $T_{SC}$ of 1.0 μm and the light-emitting end surface 4000 has $W_{RG}$ of 2.0 μm and $T_{RG}$ of 2.0 μm, for example, the light-receiving end surface 430 coincides with the central region of the light-emitting end surface 4000 in the same orientation as the light-emitting end surface 4000, as shown in FIG. 9b.

Figure 9C:
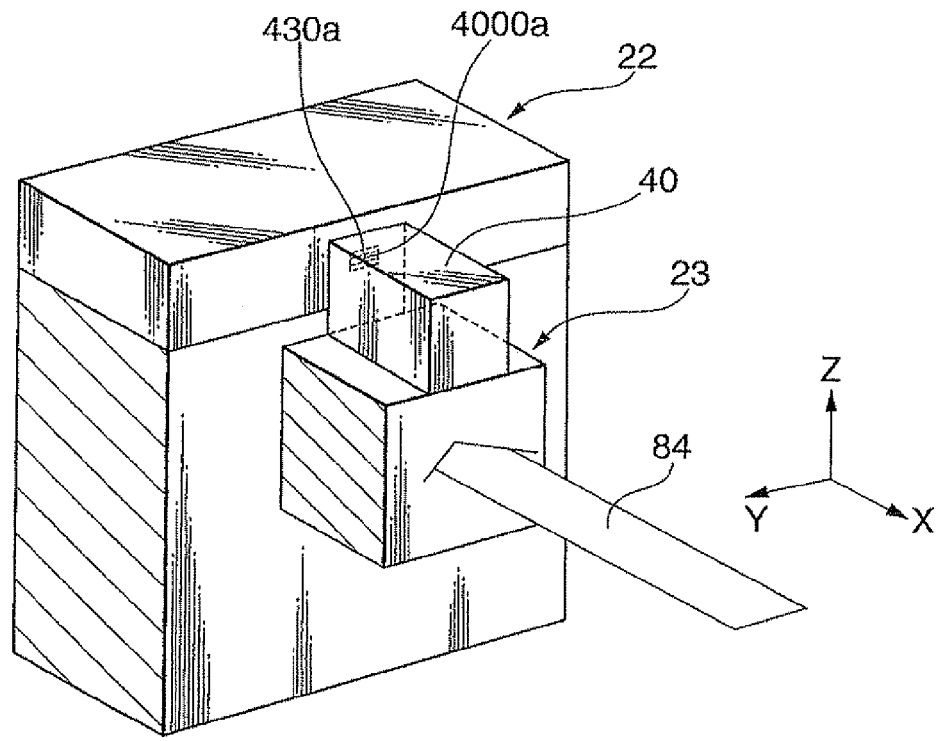
Figure 9D:
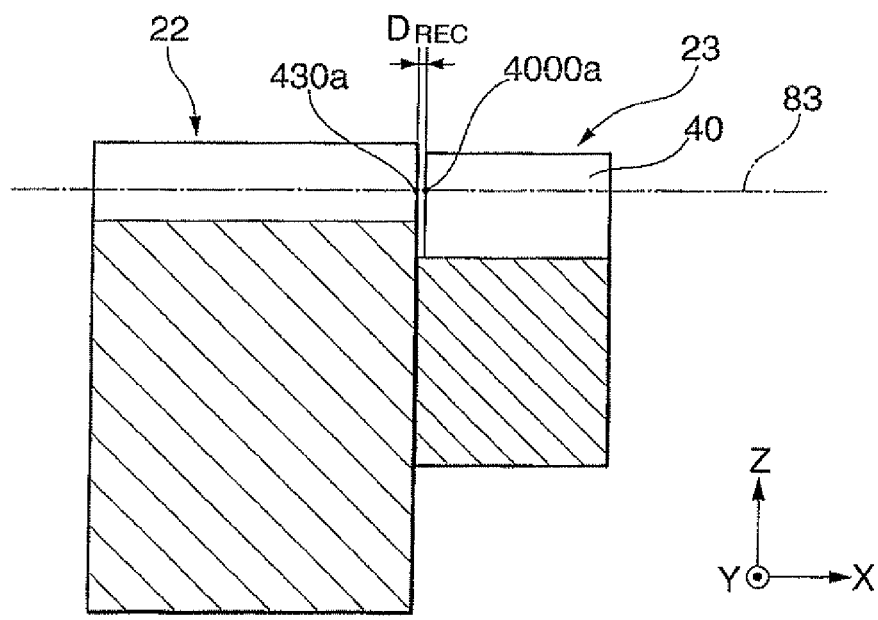

Then, as illustrated in FIG. 9c, the slider 22 and the light source unit 23 are moved with respect to each other in X-axis direction until they come into contact with each other while the positional relation between the slider 22 and the light source unit 23 in YZ plane is maintained. In FIG. 9c, the light source unit 23 is pressed against the slider 22 in –X direction as indicated by arrow 84. As shown in FIG. 9d, the light-receiving center 430a and the light-emitting center 4000a are at least at a predetermined distance D from each other as has been described with respect to FIG. 3a, even after the slider 22 and the light source unit 23 have been brought into contact with each other. The distance $D_{REC}$ is preferably in the range of 0 to 5 μm. Taking into account the thickness $t_{58}$ of a solder layer 58 (FIGS. 3a and 10), which is not depicted in FIG. 9d, the exact distance between the light-receiving center 430a and the light-emitting center 4000a is $D_{REC}+T_{58}$. The thickness $t_{58}$ may be in the range of approximately 0.05 to 5 μm, for example.

Figure 10:
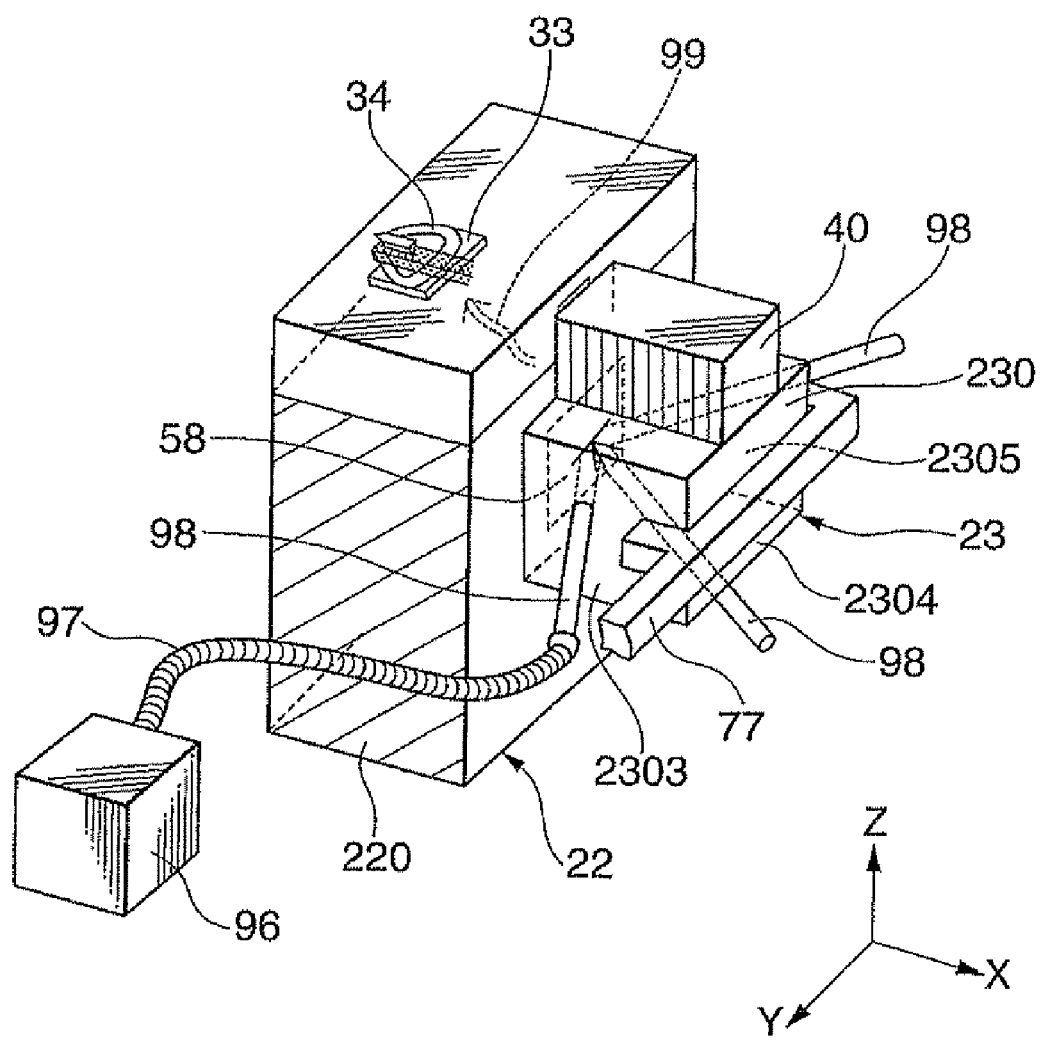
FIG. 10 shows a schematic views illustrating step 6 (FIG. 6) in an embodiment of the method for manufacturing the thermally-assisted magnetic recording head according to the present invention.

FIG. 10 shows a schematic views illustrating step 6 (FIG. 6) in an embodiment of the method for manufacturing the thermally-assisted magnetic recording head 21 according to the present invention.

As shown in FIG. 10, the light source unit 23 and the slider 22 have a contact with each other in such a manner that the solder 58 is sandwiched between them, after they are aligned with each other in YZ plane and then are moved in X-axis direction. Then, the solder layer 58 sandwiched is irradiated with light 98 having a predetermined wavelength that passes through the unit substrate 230 via the unit substrate 230. The irradiation with the light 98 melts and then solidifies the solder layer 58 to bond the light source unit 23 and slider 22.

The light 98 can be Nd-YAG laser light (which has a wavelength of 1064 nm) emitted from an Nd-YAG laser oscillator 96 through an optical fiber 97. Here, YAG is the name of a crystal having a garnet structure, made of a composite oxide ($Y_3Al_5O_{12}$) of Y (yttrium) and Al (aluminum). Nd-YAG laser light can be obtained by using a YAG crystal in which a several percent of Y is replaced with Nd (neodymium) as the laser medium. The Nd-YAG laser light is widely used in research, industrial, medical and other applications. If Nd-YAG laser light is used as the light 98, the unit substrate 230 is made from a material that has a transmittance higher than or equal to 50% at a wavelength of 1064 nm, such as Si (transmittance: 67%), GaAs (transmittance: 66%), or SiC (transmittance: 80%) so that the solder layer 58 can be irradiated with a sufficient amount of light 98 for melting which passes through the unit substrate 230. The light 98 may be other type of laser light such as YAG laser light other than Nd-YAG laser light, solid-state laser light other than YAG laser light, or gas laser light such as carbon dioxide gas laser light. In all cases, light that has a wavelength that can pass through the unit substrate 230 and has output power required for melting the solder layer 58 is used; or a material that can pass the wavelength of light used is used to form the unit substrate 230.

Further, the solder layer 58 is preferably made of an alloy having a melting point lower than 400° C. as stated above. For example, if the solder layer 58 is made of an Au—Sn alloy (containing 20 weight % of Sn), the melting point of the solder layer 58 will be approximately 280° C. Experiments have shown that irradiation of the solder layer 58 with Nd-YAG laser light 98 having light output power of 0.1 kW, a spot diameter of 100 µm, and a pulse width of 4 microseconds, for example, through the light source unit 23, melts the solder layer 58 sufficiently well enough to bond the light source unit 23 and the slider 22.

The light 98 is preferably emitted to at least one of side surfaces 2303, 2304 and 2305 of the unit substrate 230 that are adjacent to the joining surface 2300, and is directed to the solder layer 58. This prevents the light 98 from hitting the slider substrate 220 to heat the slider substrate 220 before the light 98 reaches the solder layer 58. Furthermore, the slider substrate 220 is preferably made of a material that has a lower thermal conductivity than the material of the unit substrate 230. For example, if the unit substrate 230 is made of Si (thermal conductivity: 168 W/(m·K)), the slider substrate 220 is preferably made of a material such as AlTiC ($Al_2O_3$—TiC) (thermal conductivity: 19.0 W/(m·K)) or $SiO_2$ (thermal conductivity: 10.7 W/(m·K)). In the slider 22, there is provided a magnetic head element 32 including an MR element 33 and an electromagnetic transducer 34. If these elements are heated to temperatures higher than 200° C., for example, by heat 99 from the solder layer 58, the MR multilayer 322 of the MR element 33 (FIG. 5) tends to degrade, or the main magnetic pole 3400, the lower shield 3450 (FIG. 5) or the like of the electromagnetic transducer 34 tends to thermally expand to protrude to an undesirable extent, which can result in defects. However, if the conditions of irradiation direction and thermal conductivity described above are satisfied, excessive heating of the slider substrate 220 by irradiation with the light 98 is avoided, and the amount of heat conducted to the slider substrate 220, out of the amount of heat generated from the solder layer 58 and the unit substrate 230, can be reduced. Consequently, adverse influence of heat on the MR element 33 and the electromagnetic transducer 34 can be suppressed.

As described above, the fabrication of thermally-assisted magnetic recording head 21 is completed by bonding the light-source unit 23 and the slider 22 with the solder layer 58 irradiated with the light 98. Method for bonding the light-source unit 23 and the slider 22 is not limited to the above-described embodiment. An organic adhesive can be used instead of the solder layer 58. For example, ultraviolet (UV) curable resin such as UV curable epoxy resin or UV curable acrylic resin is applied on the joining surface 2300 of the light-source unit 23 in advance. The UV curable resin may also be applied on the back surface 2201 of the slider 22 in advance, or may be applied only on the back surface 2201. After that, the light-source unit 23 and the slider 22 are contacted with each other in such a manner that the back surface 2201 and the joining surface 2300 are joined. Then, the UV curable resin in the contact portion is irradiated with UV light to be cured, thereby bonding the light-source unit 23 and the slider 22.

In the method for manufacturing the thermally-assisted magnetic recording head 21 having the "composite slider structure" described with reference to FIGS. 6 to 10, the slider 22 and the light source unit 23 can be aligned with each other with a sufficiently high alignment accuracy in a short process time under a simplified process. Specifically, in the manufacturing method, the slider 22 and the light source unit 23 are irradiated with light such as infrared light to form images of the light-receiving end surface 430 and the light-emitting end surface 4000 through image recognition, and alignment is performed on the basis of the images. Therefore, the slider 22 and the light source unit 23 can be aligned with each other in a short process time with a sufficiently high alignment accuracy, for example an accuracy of ±1 µm or higher. In practice, unlike conventional active alignment, the alignment method according to the present invention does not require a power supply probe to be applied to electrodes of the light source. Therefore, the time required for the alignment is reduced compared with the conventional active alignment. Furthermore, since no head structure or facilities for probing are required, the manufacturing load can be kept low. The method according to the present invention can achieve a high alignment accuracy compared with the conventional passive alignment because the light-receiving center 430a of the waveguide and the light-emitting center 4000a of the light source can be directly recognized through image recognition without having to rely on markers, and no operations such as inserting and withdrawing recognition means between the slider 22 and the light source unit 23 to be joined are required.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for manufacturing a thermally-assisted magnetic recording head in which a slider and a light source unit are joined to each other,
    the slider including a waveguide provided in an element-integration surface adjacent to an opposed-to-medium surface of a slider substrate, the waveguide having a light-receiving end surface extending to a back surface of the slider on the side opposite to the opposed-to-medium surface, and
    the light source unit including a light source provided in a source-installation surface adjacent to a joining surface of a unit substrate, the light source having a light-emitting end surface on the joining surface side,
    the manufacturing method comprising steps of:
    irradiating the waveguide with a first light from the opposed-to-medium surface side of the slider, and detecting the first light that has passed through the slider on the back surface side of the slider to obtain an image of the light-receiving end surface;
    determining a position of a light-receiving center in the light-receiving end surface from the image of the light-receiving end surface;
    irradiating the light source with a second light from the side opposite to the joining surface of the light source unit, and detecting the second light that has passed through the light source unit on the joining surface side of the light source unit to obtain an image of the light-emitting end surface;
    determining a position of a light-emitting center in the light-emitting end surface from the image of the light-emitting end surface;
    moving the slider and the light source unit with respect to each other on the basis of the determined position of the light-receiving center and the determined position of the light-emitting center to align the slider and the light source unit with each other; and
    bonding the slider and the light source unit together in such a manner that the back surface and the joining surface are joined to each other.

2. The manufacturing method as claimed in claim 1, wherein the slider and the light source unit are set in such a manner that the light-emitting end surface of the light source can move parallel to a reference plane including the back surface of the slider to a position in which the light-emitting end surface faces the light-receiving end surface of the waveguide, the waveguide and the light source are irradiated with the first light and the second light, respectively, and then the slider and the light source unit are moved with respect to each other in such a way that the light-emitting end surface moves parallel to the reference plane to align the slider and the light source unit with each other.

3. The manufacturing method as claimed in claim 2, wherein the slider and the light source unit are moved with respect to each other in such a way that the light-emitting center in the light-emitting end surface and the light-receiving center in the light-receiving end surface are in a straight line perpendicular to the reference plane, to align the slider and the light source unit with each other.

4. The manufacturing method as claimed in claim 1, wherein the waveguide is formed of a dielectric material, and the first light is an infrared light that has a wavelength that passes through the dielectric material.

5. The manufacturing method as claimed in claim 1, wherein the light source is formed of a semiconductor material, and the second light is an infrared light that has a wavelength that passes through the semiconductor material.

6. The manufacturing method as claimed in claim 1, wherein a first light source provided on the opposed-to-medium surface side of the slider is used to irradiate the waveguide with the first light, and the first light that has passed through the slider is detected by using a first photodetector provided on the back surface side of the slider, and wherein a second light source provided on the side opposite to the joining surface of the light source unit is used to irradiate the light source with the second light, and the second light that has passed through the light source unit is detected by using a second photodetector provided on the joining surface side of the light source unit.

7. The manufacturing method as claimed in claim 1, wherein an image of the light-receiving end surface and an image of the light-emitting end surface are formed through image recognition performed by using the detected first light and the detected second light, respectively, and then the position of the light-receiving center and the position of the light-emitting center are determined by using the formed images.

* * * * *